United States Patent
Lu

(10) Patent No.: US 12,438,358 B1
(45) Date of Patent: Oct. 7, 2025

(54) JUMPER CONTROL CIRCUIT AND JUMPER DEVICE

(71) Applicant: SHENZHEN DOMORE TECHNOLOGY LTD, Guangdong (CN)

(72) Inventor: Jing Lu, Guangdong (CN)

(73) Assignee: SHENZHEN DOMORE TECHNOLOGY LTD, Shenzhen (CN)

( * ) Notice: Subject to any disclaimer, the term of this patent is extended or adjusted under 35 U.S.C. 154(b) by 0 days.

(21) Appl. No.: 19/075,763

(22) Filed: Mar. 10, 2025

(30) Foreign Application Priority Data

Jan. 28, 2025 (CN) .......................... 202520177603.2

(51) Int. Cl.
*H02H 7/22* (2006.01)
*H02H 1/00* (2006.01)

(52) U.S. Cl.
CPC ............ *H02H 7/22* (2013.01); *H02H 1/0007* (2013.01)

(58) Field of Classification Search
CPC ......... B60R 16/02; H01R 11/22; H01R 11/24; H01R 4/48; H02H 11/002; H02J 1/122; H02J 7/0029; H02J 7/0034; H02J 7/0042; H02J 7/0045; H02J 7/00711; H02J 7/342
See application file for complete search history.

(56) References Cited

U.S. PATENT DOCUMENTS

2017/0317492 A1* 11/2017 Koebler .................. H01M 4/48
2017/0346140 A1* 11/2017 Koebler .............. H01M 4/5825
2019/0013692 A1* 1/2019 Dellevergini ........... H02J 7/345
2022/0045505 A1* 2/2022 Zhu ...................... H02H 1/0007
2025/0132581 A1* 4/2025 Lei ...................... H02J 7/00712

OTHER PUBLICATIONS

Steven M. Kaplan, "I," in Wiley Electrical and Electronics Engineering Dictionary , IEEE, 2004, pp. 356-397, doi: 10.1109/9780470547151.ch9. <https://ieeexplore.ieee.org/xpl/ebooks/bookPdfWithBanner.jsp?fileName=5273111.pdf&bkn=5273107&pdfType=chapter> (Year: 2004).*

Steven M. Kaplan, "R," in Wiley Electrical and Electronics Engineering Dictionary , IEEE, 2004, pp. 623-675, doi: 10.1109/9780470547151.ch18. <https://ieeexplore.ieee.org/xpl/ebooks/bookPdfWithBanner.jsp?fileName=5273162.pdf&bkn=5273107&pdfType=chapter> (Year: 2004).*

* cited by examiner

*Primary Examiner* — Danny Nguyen
*Assistant Examiner* — Nicolas Bellido

(57) ABSTRACT

A jumper control circuit and a jumper device, the jumper control circuit includes: a switch module, a power supply detection module, an impedance detection module and a fault processing module. The switch module is used to electrically connect to the circuit loop where the power supply device and a power consumption device are located. The power supply detection module is used to electrically connect between the positive and negative electrodes of the power supply device. A fault signal is generated when the output voltage of the power supply device exceeds a predetermined voltage range. When the resistance value of the power consumption device in the circuit loop is within a predetermined impedance range, the impedance detection module triggers the switch module to switch to the ON state. Upon receiving the fault signal, the fault processing module triggers the switch module to switch to the OFF state.

19 Claims, 14 Drawing Sheets

100 # JUMPER CONTROL CIRCUIT AND JUMPER DEVICE

CROSS-REFERENCE TO RELATED APPLICATIONS

The present application claims priority of Chinese Utility Model application No. 202520177603.2, filed on Jan. 28, 2025, the entire contents of which are hereby incorporated by reference.

TECHNICAL FIELD

The present application relates to the technical field of power supply equipment, and in particular to a jumper control circuit and a jumper device.

BACKGROUND

For electronic power consumption devices that require high-power supply, such as model airplanes, drones, energy storage power supplies, and emergency power supplies, the input current is hundreds or even thousands of amperes. When providing power to the electronic power consumption devices that require high-power supply, the power supply device will be in a relatively poor working state, and the power supply device is generally unable to communicate with and control the electronic power consumption devices. Therefore, when one of the power supply device and the electronic power consumption device fails, it is very easy to affect the other party at the same time, causing more serious failures or dangers.

SUMMARY

Based on this, the present application provides a jumper control circuit and a jumper device which can solve or at least alleviate the above technical problems.

The present application provides a jumper control circuit, including: a switch module used to electrically connect to a circuit loop where a power supply device and a power consumption device are located, and the switch module has an ON state and an OFF state; a power supply detection module used to be electrically connected between a positive electrode and a negative electrode of the power supply device, and to generate a fault signal when the output voltage of the power supply device exceeds a predetermined voltage range; an impedance detection module electrically connected to the switch module, and when the impedance of the power consumption device in the circuit loop is within a predetermined impedance range, the impedance detection module triggers the switch module to switch to the ON state; and a fault processing module electrically connected to the switch module, and when receiving the fault signal, the fault processing module triggers the switch module to switch to the OFF state.

According to the jumper control circuit of the present application, since the switch module forms an electrical circuit loop with the power supply device and the power consumption device respectively, when the switch module is in the ON state, the circuit loop where the power supply device and the power consumption device are located forms a path or passage, and the power supply device can output current to the power consumption device. When the switch module is in the OFF state, it can cut off the path between the power supply device and the power consumption device, interrupting the current transmission between the power supply device and the power consumption device. In the case where the output voltage of the power supply device exceeds the predetermined voltage range, the power supply detection module outputs a fault signal. After receiving the fault signal, the fault processing module triggers the switch module to switch to the OFF state, so as to avoid damage to the power consumption device caused by abnormal voltage when the output voltage of the power supply device exceeds the predetermined voltage range. At the same time, by judging the impedance value, the impedance detection module determines whether there is a circuit loop formed by the power consumption device and the power supply device and determines whether the state of the power consumption device is normal. In the case where the impedance value of the power consumption device in the circuit loop is within the predetermined impedance range, the impedance detection module triggers the switch module to switch to the ON state, so that when the state of the power consumption device is good, the circuit loop where the power supply device and the power consumption device are located is automatically switched to a path, avoiding damage to the power supply device due to abnormality of the power consumption device.

The present invention also provides a jumper device, comprising a jumper control circuit of any one of the above embodiments.

Figure 1:
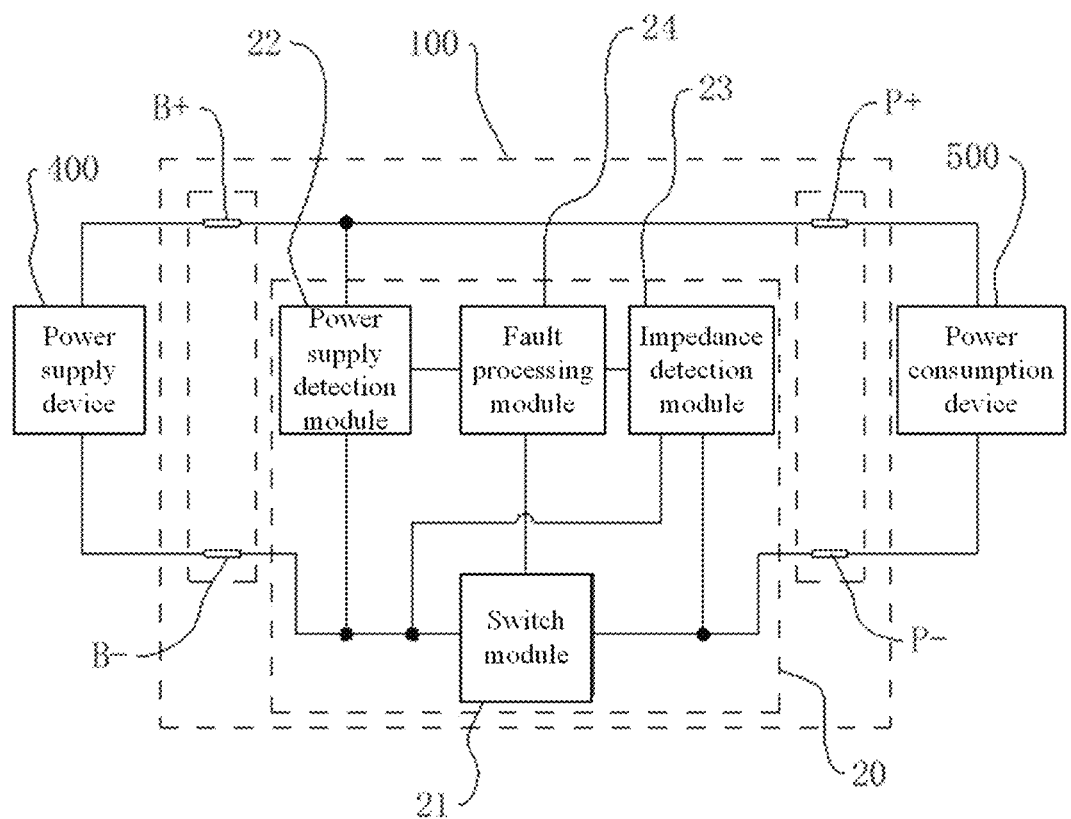
FIG. 1 is a schematic diagram of the structure of a jumper device according to an embodiment of the present application.

Description of the reference numerals in the accompanying figures: 100, jumper device; 20, jumper control circuit; 21, switch module; 22, power supply detection module; 23, impedance detection module; 231, reverse current detection module; 24, fault processing module; 241, light indication module; 242, sound warning module; 25, disconnection fault detection module; 26, delay module; 261, forward current detection module; 27, reference source module; 28, high temperature detection module; 29, low temperature detection module; 400, power supply device; 500, power consumption device.

DESCRIPTION OF EMBODIMENTS

The technical solution of the present application will be described clearly and completely below in conjunction with the accompanying drawings. The described embodiments are merely part of the embodiments of the present application, but not all of the embodiments. Based on the embodiments in the present application, all other embodiments obtained by a person skilled in the art without creative work are within the scope of protection of the present application.

In the description of the present application, it should be noted that the terms "center", "upper", "lower", "left", "right", "vertical", "horizontal", "inner", "outer", etc., indicating the orientation or positional relationship, are based on the orientation or positional relationship shown in the drawings, and are only for the convenience of describing the present application and simplifying the description, rather than indicating or implying that the device or element referred to must have a specific orientation, be constructed and operated in a specific orientation, and therefore cannot be understood as limiting the present application. In addition, the terms "first", "second", and "third" are used for descriptive purposes only, and cannot be understood as indicating or implying relative importance.

In the description of this application, it should be noted that, unless otherwise clearly specified and limited, the terms "installed", "coupled", and "connected" should be understood in a broad sense, for example, it can be a fixed connection, a detachable connection, an integral connection, a mechanical connection, an electrical connection, a direct connection, an indirect connection through an intermediate medium, or the internal connection of two components. For a person skilled in the art, the specific meanings of the above terms in this application can be understood according to specific circumstances.

The technical solutions provided by the embodiments of the present application are described below in conjunction with the accompanying drawings.

In conjunction with FIG. 1, the present application provides a jumper device 100. The jumper device 100 is used to be electrically connected between a power supply device 400 and a power consumption device 500. The output voltage or output current of the power supply device 400 is transmitted to the power consumption device 500 via the jumper device 100. Specifically, the jumper device 100 forms a circuit loop with the power supply device 400 and the power consumption device 500, respectively, and the jumper device 100 can control the ON and OFF of the circuit loops, thereby stopping or starting the current transmission between the power supply device 400 and the power consumption device 500.

Optionally, the power supply device 400 may be an automobile emergency power supply or an energy storage power supply. Optionally, the power consumption device 500 may be an automobile battery or a drone.

Specifically, the jumper device 100 comprises a jumper control circuit 20, a power supply docking terminal B+, a power supply docking terminal B−, a load docking terminal P+ and a load docking terminal P−. Specifically, the power supply docking terminal B+ is used to electrically connect to a positive electrode of the power supply device 400, and the power supply docking terminal B—is used to electrically connect to a negative electrode of the power supply device 400. The load docking terminal P+ is used to electrically connect to a positive electrode of the power consumption device 500, and the load docking terminal P− is used to electrically connect to a negative electrode of the power consumption device 500.

Optionally, any one or more of the power supply docking terminal B+, the power supply docking terminal B−, the load docking terminal P+ and the load docking terminal P− adopt a mechanical structure in the form of a clamp. Optionally, the power supply docking terminal B+ and the power supply docking terminal B—are two conductive structures of the same connector. Optionally, the load docking terminal P+ and the load docking terminal P− are two conductive structures of the same connector.

In some embodiments, the power supply docking terminal B+ is electrically connected to the load docking terminal P+, and the jumper control circuit 20 is electrically connected between the load docking terminal P+ and the load docking terminal P−. The jumper control circuit 20 can control the ON-OFF state between the load docking terminal P+ and the load docking terminal P−, so as to stop or start the current transmission between the power supply device 400 and the power consumption device 500.

The present application also provides a jumper control circuit 20, comprising: a switch module 21, a power supply detection module 22, an impedance detection module 23 and a fault processing module 24. The switch module 21 is used to electrically connect to the circuit loop where the power supply device 400 and the power consumption device 500 are located. The switch module 21 has an ON state and an OFF state. The power supply detection module 22 is used to electrically connect between the positive electrode and the negative electrode of the power supply device 400. A fault signal is generated when the output voltage of the power supply device 400 exceeds a predetermined voltage range. The impedance detection module 23 is electrically connected to the switch module 21. When the impedance value of the power consumption device 500 in the circuit loop is within a predetermined impedance range, the impedance detection module 23 triggers the switch module 21 to switch to the ON state. The fault processing module 24 is electrically connected to the switch module 21. Upon receiving the fault signal, the fault processing module 24 triggers the switch module 21 to switch to the OFF state.

For the jumper control circuit 20 of the present application, since the switch module 21 forms an electrical circuit loop with the power supply device 400 and the power consumption device 500 respectively, when the switch module 21 is in the ON state, the circuit loop where the power supply device 400 and the power consumption device 500 are located forms a ON path, and the power supply device 400 can output current to the power consumption device 500. When the switch module 21 is in the OFF state, it can cut off the path between the power supply device 400 and the power consumption device 500 and interrupt the current transmission between the power supply device 400 and the power consumption device 500. In the case where the output voltage of the power supply device 400 exceeds the predetermined voltage range, the power supply detection module 22 outputs a fault signal. After receiving the fault signal, the fault processing module 24 triggers the switch module 21 to switch to the OFF state, so as to avoid damage to the power consumption device 500 caused by abnormal voltage when the output voltage of the power supply device 400 exceeds the predetermined voltage range. At the same time, by judging the impedance value, the impedance detection module 23 determines whether there is a circuit loop formed by the power consumption device 500 and the power supply device 400 and determines whether the state of the power consumption device 500 is normal. When the impedance value of the power consumption device 500 in the circuit loop is within a predetermined impedance range, the impedance detection module 23 triggers the switch module 21 to switch to the ON state, so that the circuit loop where the power supply device 400 and the power consumption device 500 are located is automatically switched to the ON path only when the power consumption device 500 is in a good state, thereby avoiding damage to the power supply device 400 due to abnormality of the power consumption device.

Figure 7A:
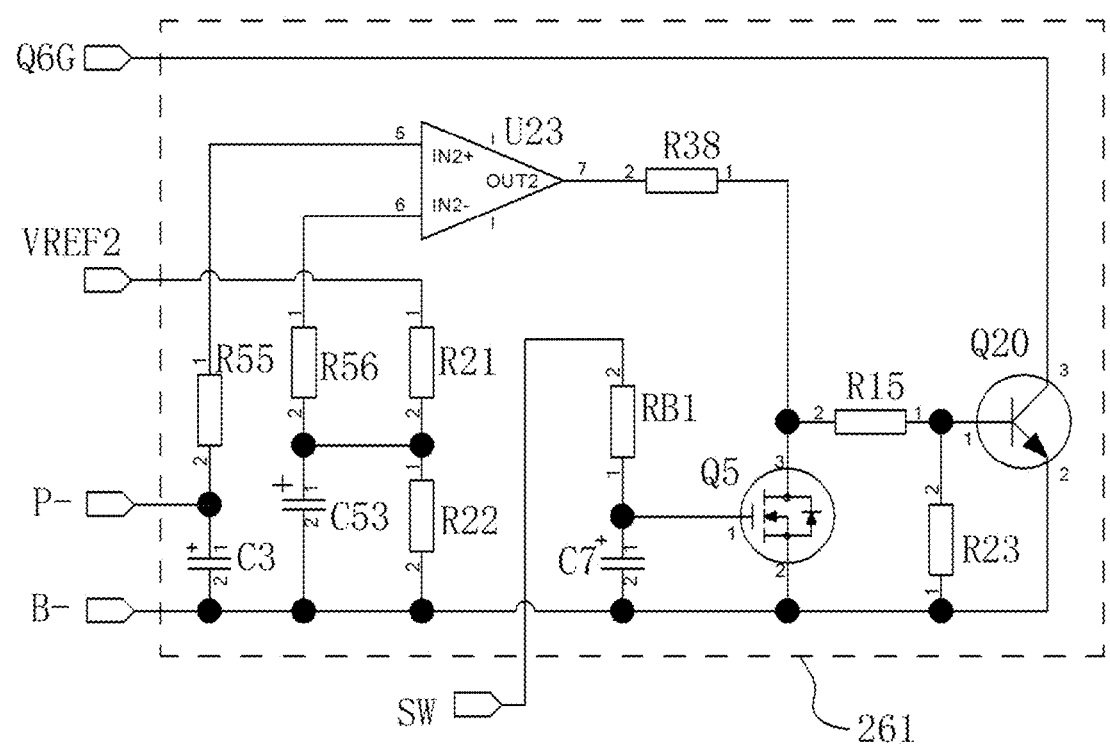
FIG. 7a is a schematic diagram of the structure of a forward current detection module in a jumper control circuit according to an embodiment of the present application.
Figure 7B:
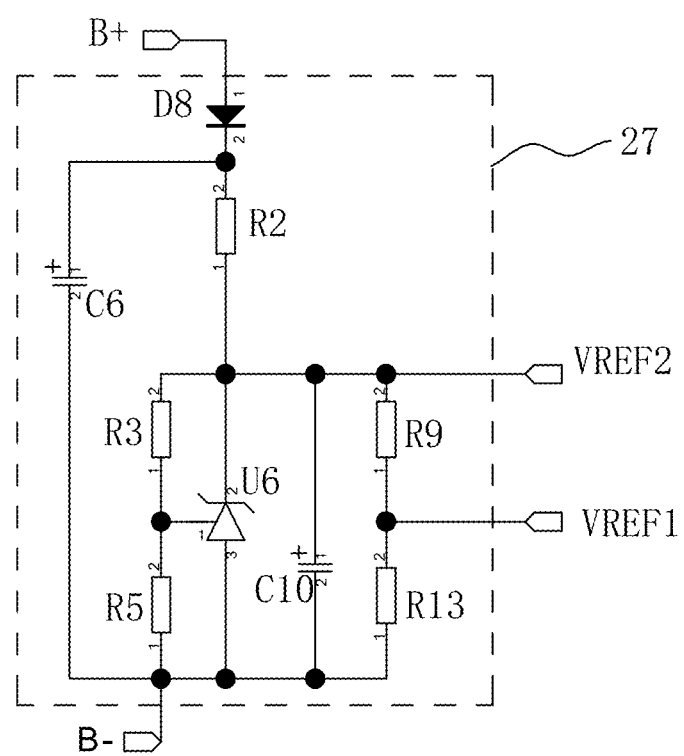
FIG. 7b is a schematic diagram of the structure of a reference source module in a jumper control circuit according to an embodiment of the present application.

In some embodiments, as shown in FIG. 7a, the jumper control circuit 20 further comprises a reference source module 27. The reference source module 27 is used to provide a reference voltage or multiple different reference voltages. Optionally, the reference source module 27 has multiple reference voltage points that respectively provide different reference voltages. Specifically, the reference source module 27 has a reference voltage point VREF1 and a reference voltage point VREF2.

Specifically, the reference source module 27 comprises a diode D8, a resistor R2, a resistor R3, a resistor R5, a chip U6, a resistor R9 and a resistor R13. The reference source module 27 is powered by the power supply docking terminal B+. Specifically, the anode of the diode D8 is electrically connected to the power supply docking terminal B+. One end of the resistor R2 is connected to the cathode of the diode D8. The other end of the resistor R2, one end of the resistor R3, one end of the resistor R9, the cathode of the chip U6, and one end of the resistor R9 are connected and used as the reference voltage point VREF2. The other end of the resistor R3, one end of the resistor R5, and the adjustment end of the chip U6 are connected together, and the output voltage of the reference voltage point VREF2 can be set by setting the resistance ratio between the resistor R3 and the resistor R5. The other end of the resistor R9 is connected to one end of the resistor R13 and used as the reference voltage point VREF1. The other end of the resistor R5, the anode of the chip U6 and the other end of the resistor R13 are respectively electrically connected to the power supply docking terminal B−.

Optionally, the reference source module 27 further comprises at least one of a capacitor C6 and a capacitor C10. The capacitor C6 or C10 is a filter capacitor. One end of the capacitor C6 is electrically connected to the cathode of the diode D8, and the other end is electrically connected to the power supply docking terminal B−. One end of the capacitor C10 is electrically connected to the cathode of the chip U6, and the other end is electrically connected to the power supply docking terminal B−.

It can be understood that the resistor R9 and the resistor R13 form a voltage divider circuit which divides the second reference voltage at the reference voltage point VREF2, thereby outputting the first reference voltage at the reference voltage point VREF1 for use by related circuits.

Exemplarily, the voltage of the reference voltage point VREF2 is set to 5V, and the voltage of the reference voltage point VREF1 is set to 2.5V. Optionally, the resistance values of the resistors R3, R5, R9, and R13 may be adjusted to change the magnitude of the first reference voltage or the second reference voltage.

Exemplarily, the chip U6 may be a programmable precision voltage reference source chip or a programmable LDO device.

Figure 2A:
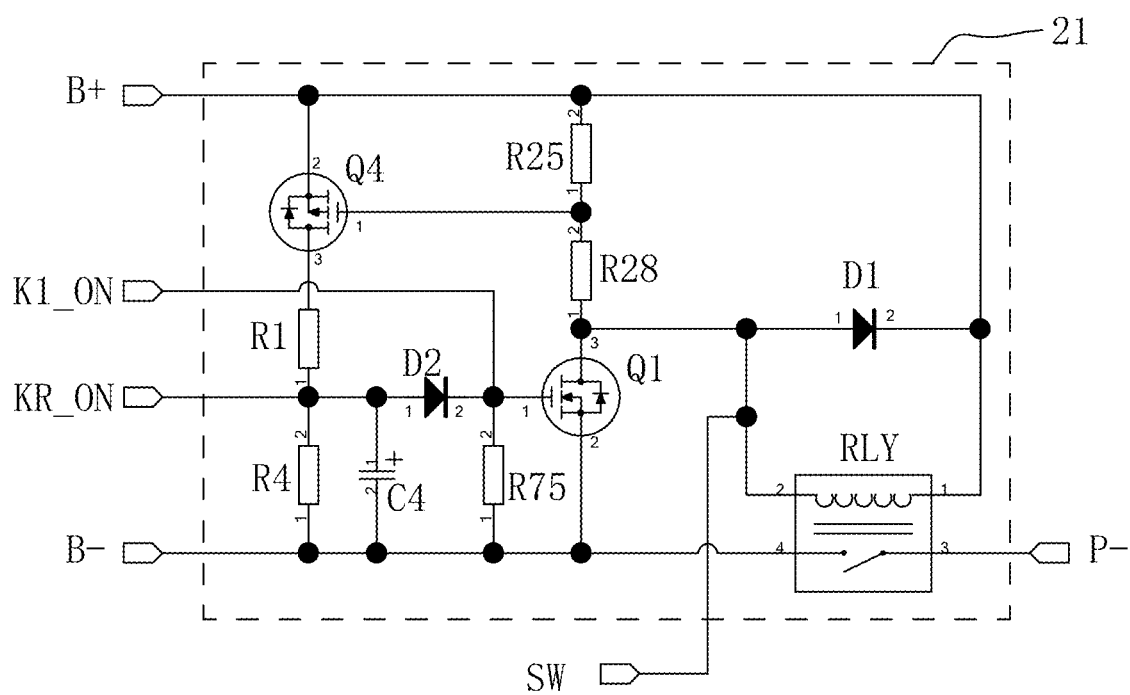
FIG. 2a is a schematic diagram of the structure of a switch module in the jumper control circuit shown in FIG. 1.

Specifically, as shown in FIG. 2a, the switch module 21 is provided with a turn-on signal terminal KR_ON electrically connected to the impedance detection module 23. The impedance detection module 23 triggers the switch module 21 through the turn-on signal terminal KR_ON.

Specifically, the impedance detection module 23 can send a turn-on signal and a turn-off signal to the switch module 21. When the turn-on signal terminal KR_ON receives the turn-on signal, the switch module 21 switches to the ON state, so that the load docking terminal P+ and the load docking terminal P− are short-circuited. After the turn-on signal terminal KR_ON receives the turn-off signal, the switch module 21 switches to the OFF state, so that an open circuit is formed between the load docking terminal P+ and the load docking terminal P−.

Optionally, the signal form of the turn-on signal is a high level, and the signal form of the turn-off signal is a low level.

In some embodiments, the switch module 21 comprises a relay RLY, a switch element Q1, and a second resistor branch. The relay RLY has a coil and a pair of normally open contacts. The switch element Q1 has a control end and two current-passing ends. One end of the coil is electrically connected to a current-passing end of the switch element Q1, the other end of the coil is used to electrically connect to the positive electrode of the power supply device 400, and the other current-passing end of the switch element Q1 is used to electrically connect to the negative electrode of the power supply device 400. One end of the second resistor branch is electrically connected to a current-passing end of the switch element Q1, and the other end of the second resistor branch is used to electrically connect to the positive electrode of the power supply device 400. When the impedance value of the power consumption device 500 in the circuit loop is within a predetermined impedance range, the impedance detection module 23 triggers the switch element Q1 to turn on/ON state. One contact of a pair of normally open contacts is used to electrically connect to the negative electrode of the power supply device 400, and the other contact is used to electrically connect to the negative electrode of the power consumption device 500.

Understandably, when the turn-on signal terminal KR_ON receives the turn-on signal, under the action of the turn-on signal, the circuit between the two current-passing ends of the switch element Q1 are turned on, so that there is a potential difference between the two ends of the coil, and the current flows by. The magnetic force generated by the energization of the coil closes a pair of normally open contacts, thereby short-circuiting the negative electrode of the power supply device 400 and the negative electrode of the power consumption device 500, so that the circuit loop where the power supply device 400 and the power consumption device 500 are located forms a ON path.

Optionally, one of the contacts is electrically connected to the negative electrode of the power supply device 400 through the power supply docking terminal B−, and the other contact is electrically connected to the negative electrode of the power consumption device 500 through the load docking terminal P−.

Optionally, a current-passing end of the switch element Q1 is used as a signal end SW, and the signal end SW can provide external feedback on whether the coil is in a power-on state.

Exemplarily, the relay RLY is a normally open relay with a single-pole single-throw. Exemplarily, the second resistor branch comprises a resistor R25 and a resistor R28. The resistor R25 and the resistor R28 are connected in series between the power supply docking terminal B+ and a current-passing end of the switch element Q1.

Optionally, the switch module 21 further comprises a resistor R1, a resistor R4, a resistor R75, a capacitor C4, a diode D1, a diode D2 and a switch element Q4, in order to improve the stability of the switch module 21. Exemplarily, the switch element Q1 and the switch element Q4 may be MOSFETs (Metal Oxide Semiconductor Field Effect Transistor), transistors or small relays.

Figure 4A:
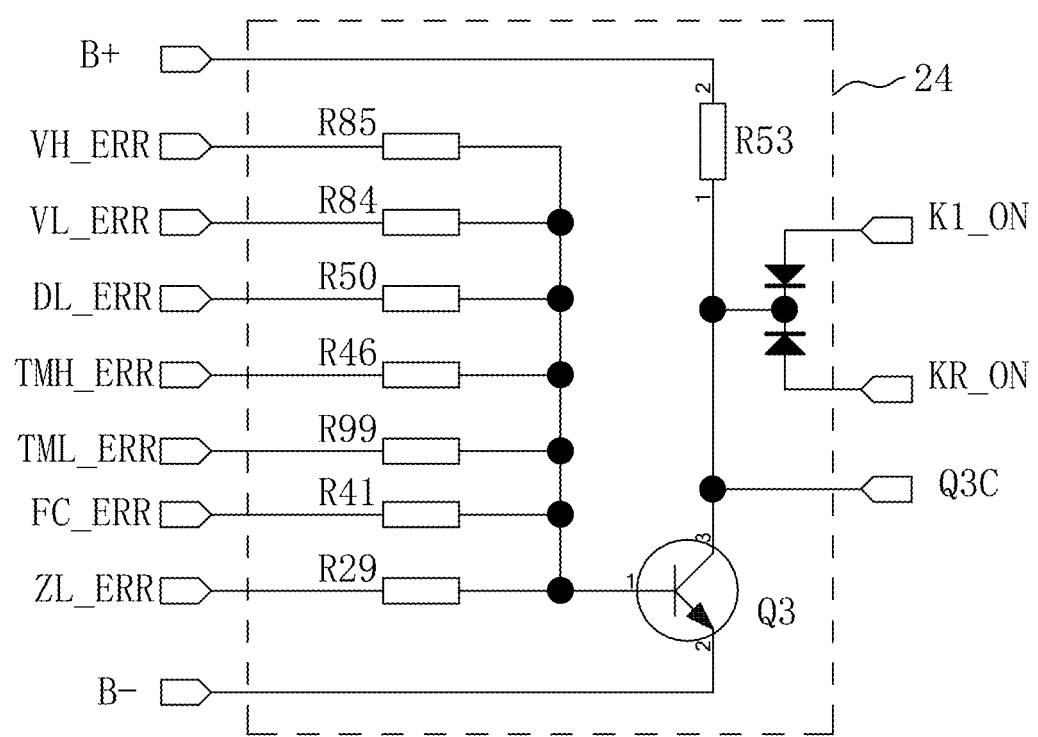
FIG. 4a is a schematic diagram of the structure of a fault processing module in the jumper control circuit shown in FIG. 1.
Figure 4B:
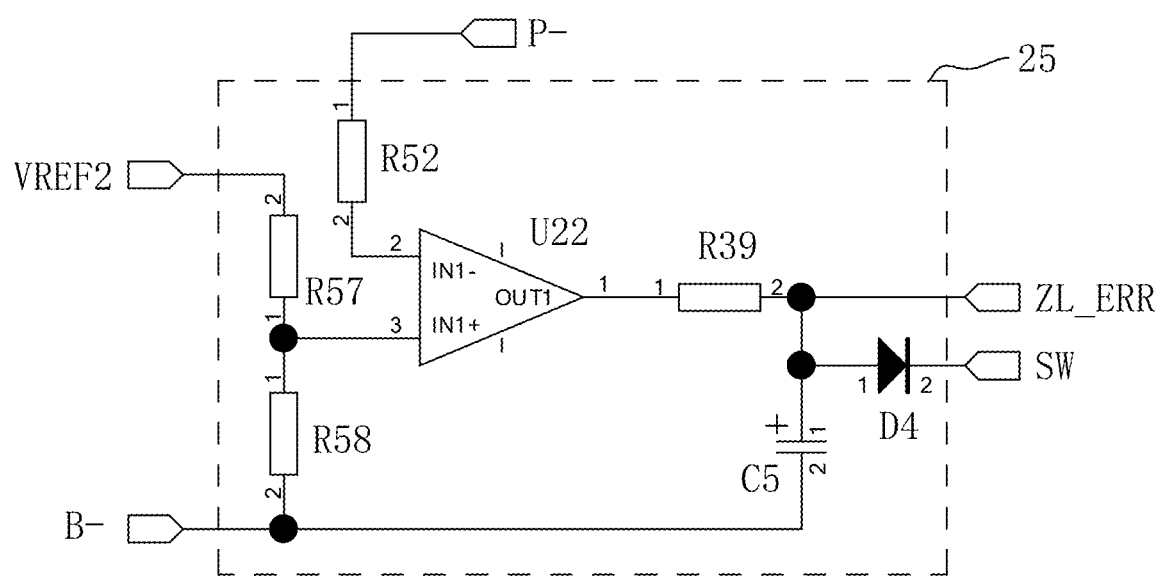
FIG. 4b is a schematic diagram of the structure of a disconnection fault detection module in the jumper control circuit shown in FIG. 1.

In some embodiments, as shown in FIG. 4b, the jumper control circuit 20 further comprises a disconnection fault detection module 25 electrically connected to the fault processing module 24. The disconnection fault detection module 25 is also electrically connected to a current-passing end of the switch element Q1 and the load docking terminal P−. When the switch element Q1 is disconnected/OFF and the potential of the load docking terminal P− relative to the negative electrode of the power supply device 400 is less than the third predetermined voltage value, the disconnection fault detection module 25 outputs a fault signal. It can be understood that when there is no potential of the load docking terminal P− relative to the negative electrode of the power supply device 400, if the coil is not in the energized state, it means that the load docking terminal P+ or the load docking terminal P− may not form a conductive contact with the power consumption device 500. The disconnection fault detection module 25 outputs a fault signal, thereby preventing the switch module 21 from switching to the ON state and preventing the output voltage of the power supply device 400 from being transmitted to the circuit between the load docking terminal P+ and the load docking terminal P−.

Specifically, the disconnection fault detection module 25 comprises a comparator U22, a resistor R52, a resistor R57, a resistor R58, a resistor R39, a diode D4, and a capacitor C5. One end of the resistor R52 is electrically connected to the load docking terminal P−. The other end of the resistor R52 is electrically connected to the inverting input terminal of the comparator U22. One end of the resistor R57 is electrically connected to the reference voltage point VREF2, and the other end of the resistor R57 is electrically connected to the non-inverting input terminal of the comparator U22 and one end of the resistor R58. One end of the resistor R39 is electrically connected to the output terminal of the comparator U22, and the other end of the resistor R39 is used as the fault signal terminal ZL_ERR, which is electrically connected to the fault processing module 24 and is used to output the fault signal. The other end of the resistor R39 is also electrically connected to the anode of the diode D4 and one end of the capacitor C5. The cathode of the diode D4 is electrically connected to the signal terminal SW of the switch module 21. The other end of the resistor R58 and the other end of the capacitor C5 are electrically connected to the power supply docking terminal B−, respectively.

Optionally, the comparator U22 is powered by the power supply device 400. Specifically, the resistor R57 and the resistor R58 divide the voltage of the reference voltage point VREF2, and input the divided voltage signal relative to the power supply docking terminal B− to the non-inverting input terminal of the comparator U22. The inverting input terminal of the comparator U22 obtains the voltage of the load docking terminal P− through the resistor R52. When the voltage at the inverting input terminal of the comparator U22 is less than the voltage at its non-inverting input terminal, the output terminal of the comparator U22 outputs a high-level signal through the resistor R39.

Further, when the comparator U22 outputs a high-level signal, if the signal terminal SW is in a high-level signal state, the fault signal output terminal ZL_ERR outputs a fault signal, thereby triggering the alarm state of the fault processing module 24. If the signal terminal SW is in a low-level signal state, the fault signal output terminal ZL_ERR outputs a low-level signal, indicating that the circuit detection is normal.

In some embodiments, as shown in FIG. 4a, the fault processing module 24 comprises a resistor R85, a resistor R84, a resistor R50, a resistor R46, a resistor R99, a resistor R41, a resistor R29, a resistor R53 and a switch element Q3. Each of the resistors R85, R84, R50, R46, R99, R41 and R29 receives the fault signal at one end and is electrically connected to the control end of the switch element Q3 at the other end. The resistor R53 is electrically connected between the power supply docking terminal B+ and a current-passing end of the switch element Q3, and the other current-passing end of the switch element Q3 is electrically connected to the power supply docking terminal B−. One current-passing end of the switch element Q3 is also electrically connected to the turn-on signal terminal KR_ON of the switch module 21.

Specifically, when a fault signal is received, the fault signal acts on the control end of the switch element Q3, causing conduction or turn-on between the two current-passing ends of the switch element Q3, and one current-passing end of the switch element Q3 outputs a low level to the turn-on signal terminal KR_ON of the switch module 21, thereby the switch module 21 is switched to the OFF state.

Figure 5A:
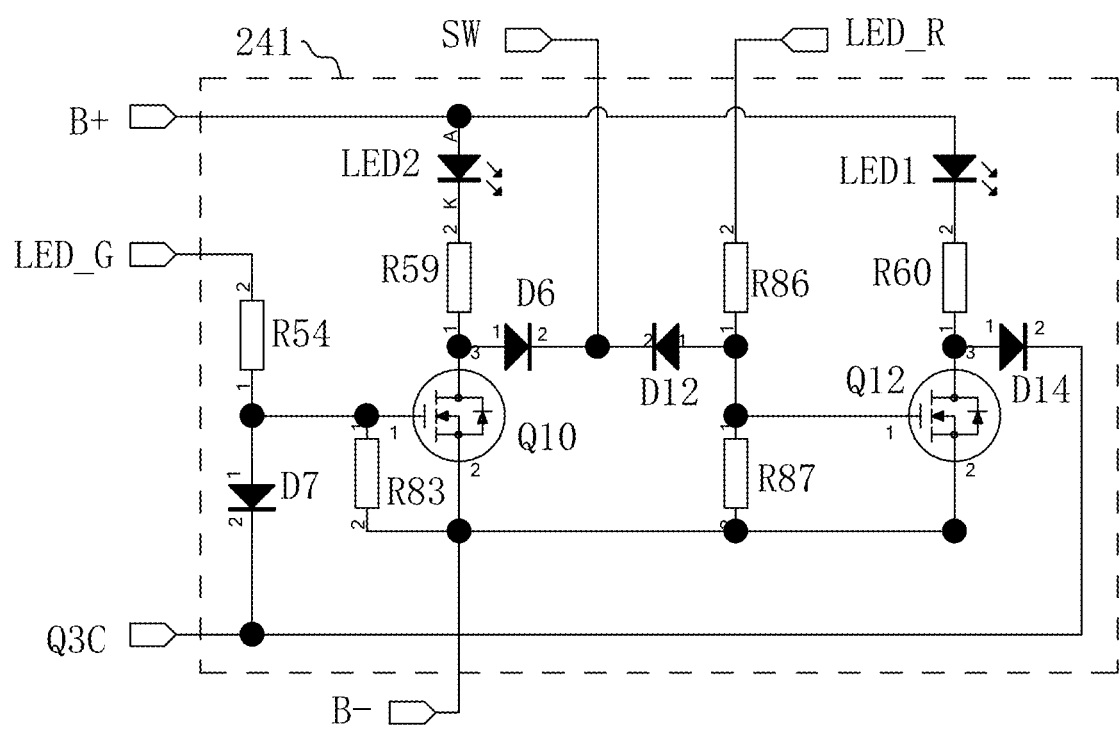
FIG. 5a is a schematic diagram of the structure of a light indication module in a jumper control circuit according to an embodiment of the present application.
Figure 5B:
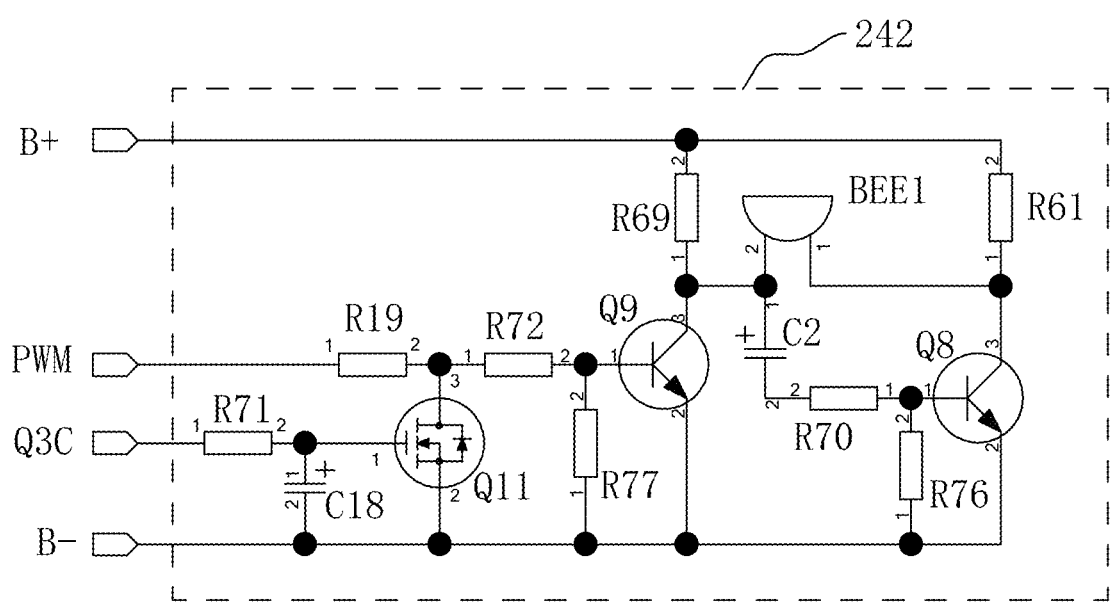
FIG. 5b is a schematic diagram of the structure of a sound warning module in a jumper control circuit according to an embodiment of the present application.

In some embodiments, as shown in FIG. 5a and FIG. 5b, the jumper control circuit 20 further comprises a light indication module 241 and a sound warning module 242 respectively electrically connected to the fault processing module 24. When receiving a fault signal, the fault processing module 24 further triggers the light indication module 241 to generate an alarm light, and triggers the sound warning module 242 to generate an alarm sound.

Specifically, as shown in FIG. 5a, the light indication module 241 comprises an indicator light LED2 and an indicator light LED1. After receiving the fault signal, the fault processing module 24 triggers the light indication module 241, so that the indicator light LED2 is turned off and the indicator light LED1 is turned on. Further, the light indication module 241 also comprises a diode D7, a diode D14, a resistor R60, a switch element Q10 and a switch element Q12. It can be understood that after the two current-passing ends of the switch element Q3 are connected, the control end of the switch element Q10 is connected to the power supply docking terminal B− through the diode D7, triggering the disconnection between the two current-passing ends of the switch element Q10, thereby turning off the indicator light LED2. At the same time, through the diode D14 and the resistor R60, the indicator light LED1 is directly turned on and is no longer controlled by the switch element Q12.

Specifically, as shown in FIG. 5b, the sound warning module 242 comprises a buzzer BEE1. After receiving the fault signal, the fault processing module 24 triggers the sound warning module 242, causing the buzzer BEE1 to emit a sound. Furthermore, the sound warning module 242 also comprises a resistor R19, a resistor R70, a resistor R71, a resistor R72, a capacitor C2, a switch element Q8, a switch element Q9, and a switch element Q11.

Specifically, the resistor R71 is electrically connected between the control end of the switch element Q11 and a current-passing end of the switch element Q3. A current-passing end of the switch element Q11 is electrically connected to the power supply docking terminal B−. When the fault processing module 24 triggers the control end of the switch element Q11, the two current-passing ends of the switch element Q11 are triggered to be disconnected, so that the PWM signal is input to the control end of the switch element Q9 through the resistor R19 and the resistor R72, so a PWM pulse is generated on a current-passing end of the switch element Q9. At the same time, the pulse signal is input to the control end of the switch element Q8 through the capacitor C2 and the resistor R70, so that a PWM pulse with the same frequency and a phase opposite to that of a current-passing end of the switch element Q9 is generated on a current-passing end of the switch element Q8, thereby causing the buzzer to ring.

Figure 3:
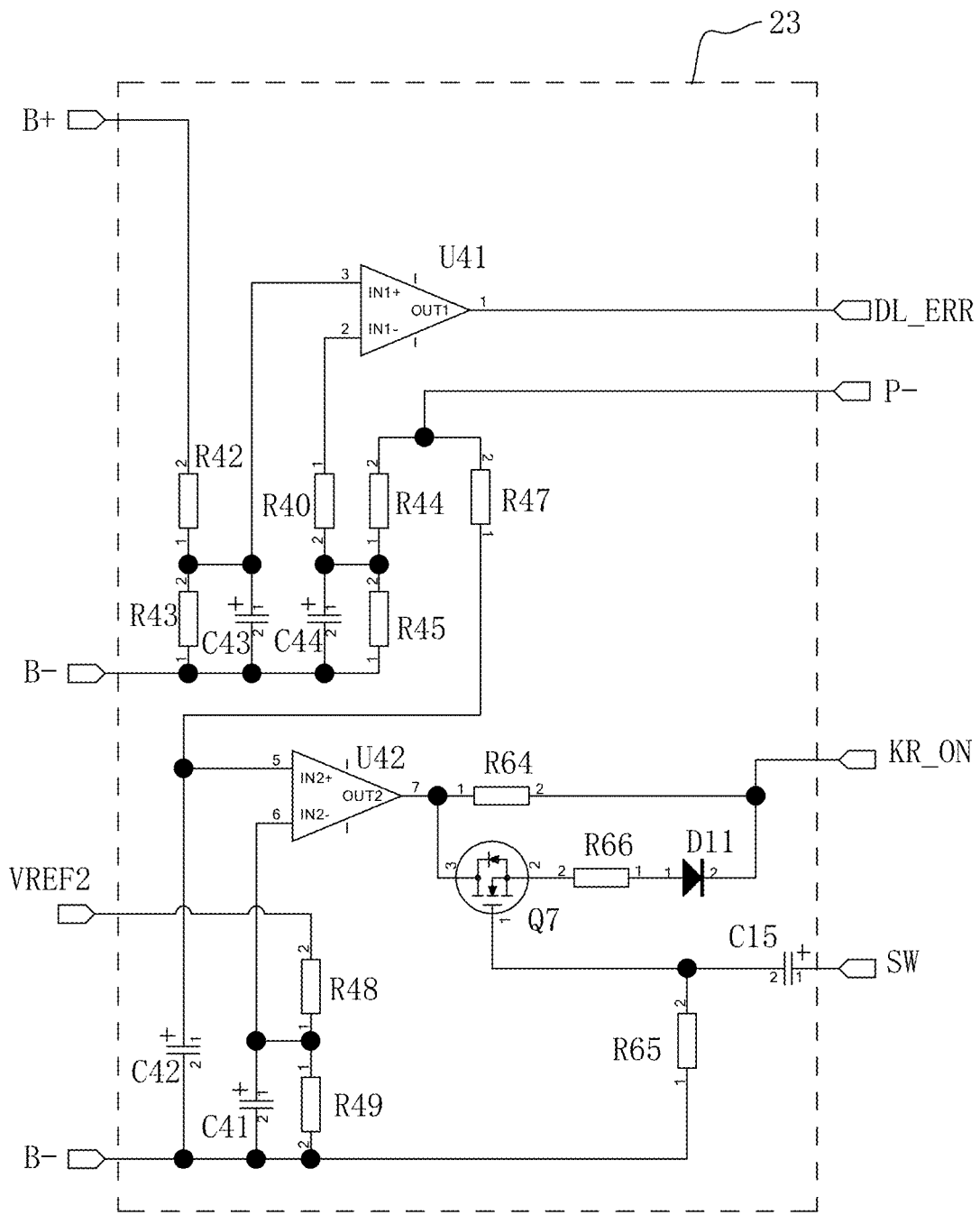
FIG. 3 is a schematic diagram of the structure of an impedance detection module in the jumper control circuit shown in FIG. 1.

In some embodiments, as shown in FIG. 3, the impedance detection module 23 comprises a first resistor branch, a comparator U41, and a comparator U42. The first resistor branch is used to be electrically connected between the negative electrode of the power supply device 400 and the negative electrode of the power consumption device 500. The middle node of the first resistor branch outputs a first feedback voltage to the inverting input terminal of the comparator U41. When the first feedback voltage is less than the first predetermined voltage value, the output terminal of the comparator U41 outputs a fault signal. One end of the first resistor branch outputs a second feedback voltage to the non-inverting input terminal of the comparator U42. When the second feedback voltage is greater than the second predetermined voltage value, the output terminal of the comparator U42 triggers the switch module 21 to switch to the ON state.

It can be understood that the power consumption device 500 can be regarded as an impedance element. When the first resistor branch and the power consumption device 500 are connected in series between the positive electrode and the negative electrode of the power supply device 400, and the first resistor branch is electrically connected between the negative electrode of the power supply device 400 and the negative electrode of the power consumption device 500, the potential difference between the two ends of the first resistor branch can reflect the impedance value of the power consumption device 500.

Understandably, when the first feedback voltage is less than the first predetermined voltage value, the impedance of the power consumption device 500 is lower than the lower limit of the predetermined impedance range. At this time, the power consumption device 500 may be abnormal, so the output terminal of the comparator U41 outputs a fault signal to the fault processing module 24 to prevent the switch module 21 from switching to the ON state.

Exemplarily, the first resistor branch comprises a resistor R44 and a resistor R45. One end of the resistor R44 is electrically connected to the load docking terminal P−, and the other end of the resistor R44 is electrically connected to one end of the resistor R45. The other end of the resistor R45 is electrically connected to the power supply docking terminal B−.

Specifically, as shown in FIG. 3, the impedance detection module 23 further comprises a resistor R40, a resistor R42, and a resistor R43. One end of the resistor R42 is electrically connected to the power supply docking terminal B+, and the other end of the resistor R42 and one end of the resistor R43 are electrically connected to the non-inverting input terminal of the comparator U41. One end of the resistor R40 is electrically connected to the other end of the resistor R44, and the other end of the resistor R40 is electrically connected to the inverting input terminal of the comparator U41. The output terminal of the comparator U41 is used as the fault signal terminal DL_ERR and is electrically connected to the fault processing module 24.

Understandably, when the voltage at the inverting input terminal of the comparator U41 is lower than the voltage at the non-inverting input terminal of the comparator U41, it is equivalent to that the impedance of the power consumption device 500 is lower than the lower limit of the predetermined impedance range, and the output terminal of the comparator U41 outputs a fault signal in the form of a high level, thereby triggering the fault processing module 24 to enter the alarm state, and making the comparator U42 invalid in the triggering effect on the switch module 21. It is understandable that in the alarm state, the fault processing module 24 at least triggers the switch module 21 to switch to the OFF state.

Optionally, the impedance detection module 23 further comprises at least one of a capacitor C43 and a capacitor C44. The capacitor C43 or the capacitor C44 is a filter capacitor. The capacitor C43 is electrically connected between the non-inverting input terminal of the comparator U41 and the power supply docking terminal B−. The capacitor C44 is electrically connected between one end of the resistor R40 and the power supply docking terminal B−.

Specifically, the impedance detection module 23 further comprises a resistor R47, a resistor R48, a resistor R49 and a resistor R64. One end of the resistor R47 is electrically connected to the load docking terminal P−, and the other end of the resistor R47 is electrically connected to the non-inverting input terminal of the comparator U42. One end of the resistor R48 is electrically connected to the reference voltage point VREF2. The other end of the resistor R48 and one end of the resistor R49 are electrically connected to the inverting input terminal of the comparator U42.

Optionally, the impedance detection module 23 further comprises at least one of a capacitor C42 and a capacitor C41. The capacitor C42 or the capacitor C41 is a filter capacitor. One end of the capacitor C42 is electrically connected to the other end of the resistor R47, and the other end of the capacitor C42 is electrically connected to the power supply docking terminal B−. One end of the capacitor C41 is electrically connected to the other end of the resistor R48, and the other end of the capacitor C41 is electrically connected to the power supply docking terminal B−.

Understandably, when the impedance of the power consumption device 500 is larger, the voltage of the non-inverting input terminal of the comparator U42 is lower. Understandably, when the voltage of the inverting input terminal of the comparator U42 is higher than the voltage of the non-inverting input terminal of the comparator U42, it is equivalent to that the impedance of the power consumption device 500 is higher than the upper limit of the predetermined impedance range, and the output terminal of the comparator U42 outputs a low-level signal, triggering the switch module 21 to switch to the OFF state. When the voltage of the inverting input terminal of the comparator U42 is lower than the voltage of the non-inverting input terminal of the comparator U42, the impedance of the power consumption device 500 is lower than the upper limit of the predetermined impedance range, and the output terminal of the comparator U42 outputs a high-level signal, triggering the switch module 21 to switch to the ON state.

Exemplarily, the lower impedance value of the predetermined impedance range is set to 35Ω; the upper impedance value of the predetermined impedance range is set to 20KΩ. Optionally, the upper impedance value or the lower impedance value can be adjusted by adjusting the resistance values of the resistors R42, R43, R44, and R45. Understandably, any one or more of the resistors R42, R43, R44, and R45 can be equivalent resistances of multiple resistors connected in series and in parallel.

Optionally, the comparator U41 and the comparator U42 are directly powered by the power supply device 400.

Furthermore, the impedance detection module 23 further comprises a switch element Q7, a resistor R66, a diode D11, a resistor R65 and a capacitor C15.

Specifically, the capacitor C15 is a signal coupling capacitor. The output terminal of the comparator U42 is electrically connected to one end of the resistor R64 and a current-passing end of the switch element Q7. The other current-passing end of the switch element Q7 is electrically connected to one end of the resistor R66. The other end of the resistor R66 is electrically connected to the anode of the diode D11. The turn-on signal terminal KR_ON is electrically connected to the other end of the resistor R64 and the cathode of the diode D11. One end of the capacitor C15 is electrically connected to the signal terminal SW. The other end of the capacitor C15 is electrically connected to the control end of the switch element Q7 and one end of the resistor R65. The load online circuit part is used to output the voltage of output terminal of the comparator U42 to the turn-on signal terminal KR_ON through the resistor R66 when the signal at the terminal SW jumps.

It is understandable that when the voltage between the positive and negative electrodes of the power consumption device 500 is greater than the output voltage of the power supply device 400, the current in the circuit loop will be caused to flow from the positive electrode of the power supply device 400 to the negative electrode of the power supply device 400, forming a reverse current, which may cause damage to the power supply device 400.

Figure 6A:
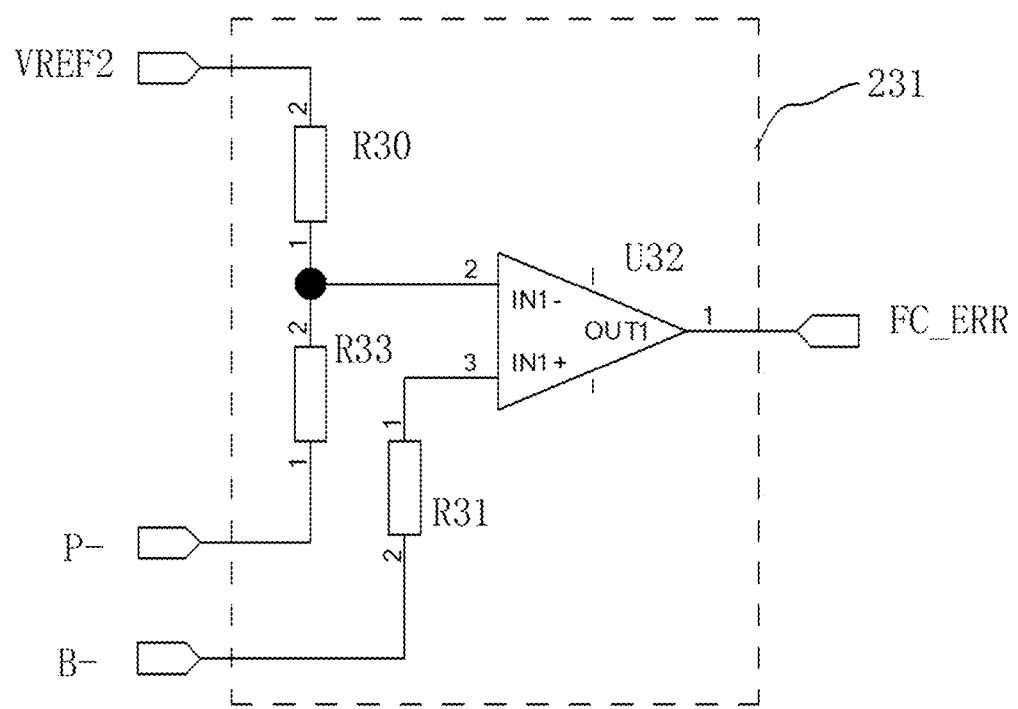
FIG. 6a is a schematic diagram of the structure of a reverse current detection module in a jumper control circuit according to an embodiment of the present application.

In some embodiments, as shown in FIG. 6a, the jumper control circuit 20 further comprises a reverse current detection module 231. The reverse current detection module 231 is used to be electrically connected between the negative electrode of the power supply device 400 and the load docking terminal P−. When the potential of the load docking terminal P− is greater than the potential of the negative electrode of the power supply device 400, the reverse current detection module 231 generates a fault signal. It is understandable that since the load docking terminal P− is used to electrically connect to the negative electrode of the power consumption device 500, when a reverse current is formed, the potential of the load docking terminal P− is greater than the potential of the negative electrode of the power supply device 400. Under the triggering of the reverse current detection module, the fault handling module 24 triggers the switch module 21 to switch to the OFF state, thereby avoiding damage to the power supply device 400.

Specifically, the reverse current detection module 231 comprises a resistor R30, a resistor R33, a resistor R31 and a comparator U32. One end of the resistor R30 is electrically connected to the reference voltage point VREF2, and the other end of the resistor R30 is electrically connected to one end of the resistor R33 and the inverting input terminal of the comparator U32. The other end of the resistor R33 is electrically connected to the load docking terminal P−. One end of the resistor R31 is electrically connected to the power supply docking terminal B−, and the other end of the resistor R31 is electrically connected to the non-inverting input terminal of the comparator U32. The output terminal of U32 is used as a fault signal terminal FC_ERR, which is electrically connected to the fault processing module 24 and is used to output a fault signal. Optionally, the comparator U32 is powered by the power supply device 400.

It can be understood that when the current flows from the negative electrode of the power supply device 400 to the negative electrode of the power consumption device 500, the potential of the load docking terminal P− is lower than that of the negative electrode of the power supply device 400. Through the resistor R33, the voltage between the load docking terminal P− and the negative electrode of the power supply device 400 makes the voltage of the inverting input terminal of the comparator U32 less than or equal to the voltage of the non-inverting input terminal of the comparator U32, thereby triggering the output terminal of the comparator U32 to output a fault signal to the fault processing module 24, causing the fault processing module 24 to enter an alarm state.

It is understandable that when the switch module 21 is switched to the ON state under the triggering of the impedance detection module 23, if the load docking terminal P+ and the load docking terminal P− are separated from the positive and negative electrodes of the power consumption device 500, and if there is still an output voltage of the power supply equipment 400, there is a risk of short circuit between the load docking terminal P+ and the load docking terminal P−.

Figure 6B:
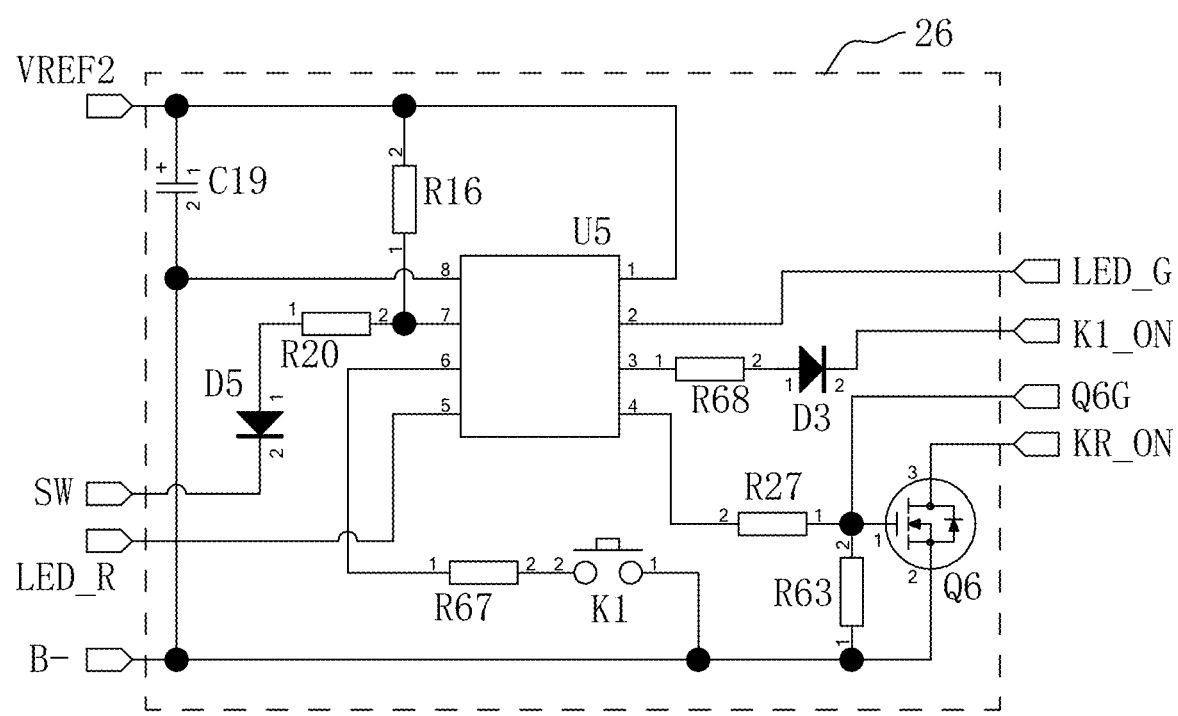
FIG. 6b is a schematic diagram of the structure of a delay module in a jumper control circuit according to an embodiment of the present application.

In some embodiments, as shown in FIG. 6b, the jumper control circuit 20 further comprises a delay module 26 electrically connected to the switch module 21. The delay module 26 periodically interrupts the control of the impedance detection module 23 to the switch module 21, and triggers the switch module 21 to switch to the OFF state. After the delay module 26 triggers the switch module 21 to switch to the OFF state, if the load docking terminal P+ and the load docking terminal P− are still docked with the power consumption device, the impedance detection module 23 will re-trigger the switch module 21 to switch to the ON state, so that the circuit loop where the power supply device 400 and the power consumption device 500 are located continues to maintain the passage. If the load docking terminal P+ and the load docking terminal P− are actually separated from the positive and negative electrodes of the power consumption device 500, the switch module 21 will remain the OFF state to prevent the load docking terminal P+ and the load docking terminal P− from short-circuiting and discharging.

In some embodiments, the delay module 26 comprises a resistor R63, a resistor R27, a chip U5 and a switch element Q6. The chip U5 is provided with a plurality of pins. Optionally, the chip U5 is integrated with one or more of a first timer, a second timer, a third timer and a fourth timer. Optionally, the timing cycle of the first timer is about 200 ms. The timing cycle of the second timer is about 1.5 seconds. The timing cycle of the third timer is about 3 seconds. The timing cycle of the fourth timer is about 30 seconds.

Exemplarily, the fourth pin of the chip U5 is electrically connected to one end of the resistor R27. The other end of the resistor R27 is electrically connected to one end of the resistor R63 and the control end of the switch element Q6.

One current-passing end of the switch element Q6 is electrically connected to the turn-on signal terminal KR_ON of the switch module 21, and the other current-passing end of the switch element Q6 is electrically connected to the power supply docking terminal B− and the other end of the resistor R63.

Specifically, the second timer has two timing states. The first one is that when the chip U5 is powered on, the second timer starts timing. After the first timing of the second timer overflows, the fourth pin of the chip U5 triggers the switch element Q6 to turn on, and outputs a low-level pulse signal to the turn-on signal terminal KR_ON. Thereafter, the second timer automatically resets and restarts timing, returns to the state of the first timing, and loops infinitely until power is cut off. The second one is that the timing is triggered by the low-level signal of the seventh pin of the chip U5. Optionally, the timing cycle of the second timer is 1.5s, so the delay module 26 performs interruption on the impedance detection module 23 once every 1.5s.

In some embodiments, the delay module 26 has a button K1. When the button K1 is triggered, the delay module 26 triggers the switch module 21 to switch to the ON state. Understandably, in some cases, when the impedance of the power consumption device 500 is outside the predetermined impedance range, it may still be necessary to switch the switch module 21 to the ON state.

Specifically, the delay module 26 further comprises a resistor R67. The sixth pin of the chip U5 is electrically connected to one end of the resistor R67; the other end of the resistor R67 is electrically connected to one end of the button K1, and the other end of the button K1 is electrically connected to the power supply docking terminal B−. When the sixth pin of the chip U5 is connected to the power supply docking terminal B− through the resistor R67 by the button K1, the third timer will be triggered to start timing. After the timing of the third timer overflows, the trigger chip U5 triggers the switch module 21 to switch to the ON state. Optionally, the timing cycle of the third timer is 3s.

Further, the switch module 21 is provided with a turn-on signal terminal K1_ON electrically connected to the delay module 26. The delay module 26 triggers the switch module 21 via the turn-on signal terminal K1_ON. More specifically, after the timing of the third timer overflows, the third pin of the trigger chip U5 outputs a high level to the turn-on signal terminal K1_ON. Further, the delay module 26 also comprises a resistor R68 and a diode D3. The third pin of the chip U5 is connected to one end of the resistor R68, and the other end of the resistor R68 is electrically connected to the anode of the diode D3. The cathode of the diode D3 is electrically connected to the signal terminal K1_ON.

Furthermore, the delay module 26 further comprises a resistor R16, a resistor R20, a capacitor C19 and a diode D5. One end of the capacitor C19 is electrically connected to the first pin of the chip U5 and the reference voltage point VREF2. The other end of the capacitor C19 is electrically connected to the power supply docking terminal B−. Specifically, the reference voltage point VREF2 provides a high-precision reference voltage power supply to the delay module 26. The capacitor C19 is a filter capacitor. The second pin of the chip U5 is electrically connected to the signal terminal LED_G. The fifth pin of the chip U5 is connected to the signal terminal LED_R. The seventh pin of the chip U5 is electrically connected to one end of the resistor R16 and one end of the resistor R20. The other end of the resistor R16 is electrically connected to the reference voltage point VREF2. The other end of the resistor R20 is electrically connected to the anode of the diode D5. The cathode of the diode D5 is electrically connected to the signal terminal SW.

Specifically, when the reference voltage point VREF2 supplies power and the chip U5 is powered on, the first timer starts timing. When the timing of the first timer overflows for the first time, the second pin of the chip U5 will be triggered to output a high level to the signal terminal LED_G, and the fifth pin of the chip U5 will output a low level to the signal terminal LED_R. The first timer will be automatically reset at the same time, and the timing will start from 0 again. When the timing of the first timer overflows for the second time, the second pin of the chip U5 will be triggered to output a low level to the signal terminal LED_G, and the fifth pin of the chip U5 will output a high level to the signal terminal LED_R. The first timer will be automatically reset at the same time, and the timing will start from 0 again, and returns to the state of the first timing. The timing of the first timer is infinitely looped until the chip U5 is powered off.

Specifically, when the signal terminal SW is at a low level, the connection trigger circuit of the chip U5 causes the seventh pin of the chip U5 to receive a low-level signal, thereby triggering the fourth timer to start timing. After the timing of the fourth timer overflows, the fourth pin of the chip U5 will output a low-level signal to the signal terminal KR_ON through the switch element Q6. At the same time, the third pin of the chip U5 outputs a low level to the signal terminal K1_ON.

It is understandable that when the current flows from the negative electrode of the power consumption device 500 to the negative electrode of the power supply device 400, a positive current exists in the circuit loop where the power supply device 400 and the power consumption device 500 are located.

In some embodiments, as shown in FIG. 7a, the jumper control circuit 20 further comprises a forward current detection module 261. The forward current detection module 261 is used to be electrically connected between the negative electrode of the power supply device 400 and the negative electrode of the power consumption device 500; when the potential of the negative electrode of the power consumption device 500 relative to the negative electrode of the power supply device 400 is greater than a fourth predetermined voltage value, the forward current detection module 261 outputs a power-on signal. Upon receiving the power-on signal, the delay module 26 stops interrupting the impedance detection module 23 and stops triggering the switch module 21, thereby preventing the switch module 21 from switching from the ON state to the OFF state when a forward current passes through the switch module 21, preventing the current transmission from being affected.

Specifically, the forward current detection module 261 comprises a resistor R55, a capacitor C3, a resistor R56, a capacitor C53, a resistor R21, a resistor R22, a comparator U23, a resistor R38, a resistor RB1, a capacitor C7, a switch element Q5, a resistor R15, a resistor R23 and a switch element Q20.

Optionally, the comparator U23 is powered directly by the power supply terminal. Capacitor C3, capacitor C53 and capacitor C7 are filter capacitors.

One end of the resistor R55 is electrically connected to one end of the capacitor C3 and the load docking terminal P−. The other end of the capacitor C3 is electrically connected to the power supply docking terminal B−. The other end of the resistor R55 is electrically connected to the non-inverting input terminal of the comparator U23.

One end of the resistor R56 is electrically connected to one end of the capacitor C53, one end of the resistor R21, and one end of the resistor R22. The other end of the resistor R21 is electrically connected to the reference voltage point VREF2. The other end of the resistor R56 is electrically connected to the inverting input terminal of the comparator U23. The other end of the capacitor C53 and the other end of the resistor R22 are electrically connected to the power supply docking terminal B−.

The output terminal of the comparator U23 is electrically connected to one end of the resistor R38. The other end of the resistor R38 is electrically connected to one end of the resistor R15 and a current-passing end of the switch element Q5. The other end of the resistor R15 is electrically connected to one end of the resistor R23 and a control end of the switch element Q20. The other end of the resistor R23 is electrically connected to a current-passing end of the switch element Q20. Further, the other current-passing end of the switch element Q20 serves as a signal terminal Q6G. Specifically, the signal terminal Q6G is electrically connected to the control end of the switch element Q6.

One end of the resistor RB1 is electrically connected to the signal terminal SW. The other end of the resistor RB1 is electrically connected to one end of the capacitor C7 and the control end of the switch element Q5. The other end of the capacitor C7 is electrically connected to the other current-passing end of the switch element Q5 and the power supply docking terminal B−.

When the non-inverting input terminal of the comparator U23 obtains, from the load docking terminal P−, a voltage higher than the inverting input terminal of the comparator U23, it is equivalent to that a forward current exists in the circuit loop where the power supply device 400 and the power consumption device 500 are located. At this time, the output terminal of the comparator U23 outputs a low level to the signal terminal Q6G through the switch element Q20, thereby inhibiting the chip U5 from triggering the control end of the switch element Q6 and preventing the switch module 21 from switching from the ON state to the OFF state.

Figure 2B:
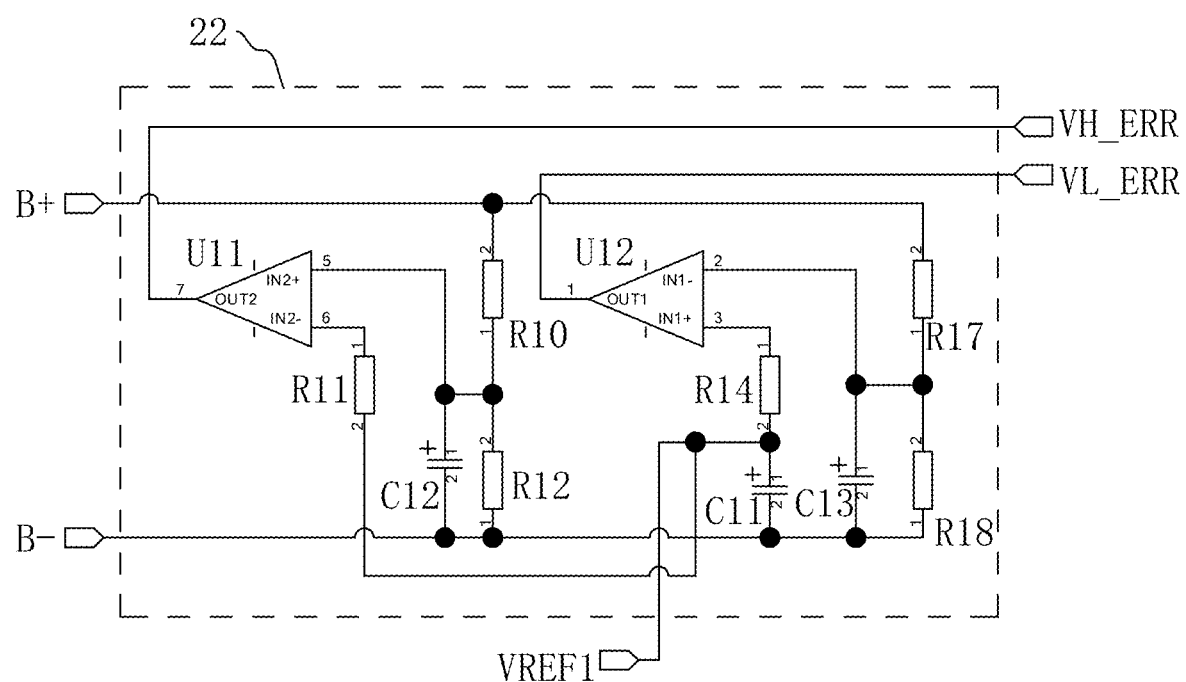
FIG. 2b is a schematic diagram of the structure of a power supply detection module in the jumper control circuit shown in FIG. 1.

In some embodiments, as shown in FIG. 2b, the power supply detection module 22 comprises a comparator U11, a resistor R10, a resistor R11, a resistor R12, and a capacitor C12. One end of the resistor R10 is electrically connected to the power supply docking terminal B+. The other end of the resistor R10 is electrically connected to one end of the resistor R12, one end of the capacitor C12, and the non-inverting input terminal of the comparator U11. The other end of the resistor R12 is electrically connected to the other end of the capacitor C12 and the power supply docking terminal B−. The output terminal of the comparator U11 is used as a fault signal terminal VH_ERR and is electrically connected to the fault processing module 24. The inverting input terminal of the comparator U11 is electrically connected to one end of the resistor R11; the other end of the resistor R11 is electrically connected to the reference voltage point VREF1.

Understandably, the comparator U11, the resistor R10, the resistor R12, the resistor R11, and the capacitor C12 form a detection structure of the upper limit voltage of the power supply device 400. The power supply device 400 supplies power to the comparator U11, and the resistor R10, the resistor R12, and the capacitor C12 provide a divided voltage to the non-inverting input terminal of the comparator U11. The inverting input terminal of the comparator U11 obtains a reference signal voltage used for judgment from the reference voltage point VREF1 through the resistor R11.

When the voltage at the non-inverting input terminal of the comparator U11 is higher than that of the inverting input terminal of the comparator U11, the output terminal of the comparator U11 outputs a fault signal to the fault signal terminal VH_ERR, thereby triggering the alarm state of the fault processing module 24.

In some embodiments, the power supply detection module 22 comprises a resistor R14, a resistor R17, a resistor R18, a capacitor C11, a capacitor C13 and a comparator U12. One end of the resistor R17 is electrically connected to the power supply docking terminal B+, and the other end of the resistor R17 is electrically connected to one end of the resistor R18, one end of the capacitor C13 and the inverting input terminal of the comparator U12. The other end of the resistor R18 is electrically connected to the other end of the capacitor C13 and the power supply docking terminal B−. The output terminal of the comparator U12 serves as the fault signal terminal VL_ERR and is electrically connected to the fault processing module 24. The non-inverting input terminal of the comparator U12 is electrically connected to one end of the resistor R14; the other end of the resistor R14 is electrically connected to the reference voltage point VREF1.

Specifically, the comparator U12, the resistor R17, the resistor R18, the resistor R14 and the capacitor C13 form a detection structure of the lower limit voltage of the power supply device 400. Specifically, the power supply device 400 supplies power to the comparator U12. The resistor R17, the resistor R18 and the capacitor C13 form the voltage divider circuit which provides the divided voltage of the output voltage of the power supply device 400 to the inverting input terminal of the comparator U12; the non-inverting input terminal of the comparator U12 obtains the reference signal voltage used for judgment from the reference voltage point VREF1 through the resistor R14. When the voltage of the inverting input terminal of the comparator U12 is lower than that of the non-inverting input terminal of the comparator U12, the output terminal of the comparator U12 outputs a fault signal to the fault signal terminal VL_ERR, thereby triggering the alarm state of the fault processing module 24.

Optionally, the resistors R10, R17, R18 and R12 may be equivalent resistance of multiple resistors connected in series or in parallel. By adjusting the resistance values of the resistors R10, R12, R17 and R18, the voltage detection range between the upper limit voltage and the lower limit voltage of the power supply device 400 detected by the power supply detection module 22 may be adjusted.

Figure 8A:
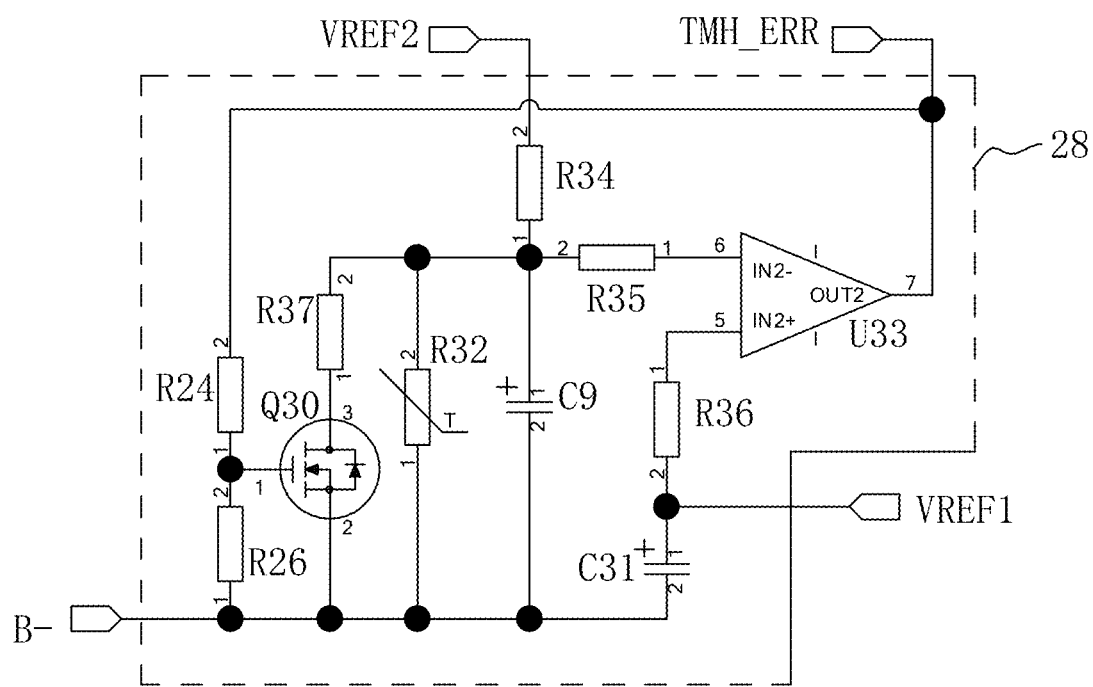
FIG. 8a is a schematic diagram of the structure of a high temperature detection module in a jumper control circuit according to an embodiment of the present application.

In some embodiments, as shown in FIG. 8a, the jumper control circuit 20 further comprises a high temperature detection module 28 and a low temperature detection module 29 to implement protection according to the temperature conditions around the jumper control circuit 20.

Specifically, the high temperature detection module 28 comprises a comparator U33, a resistor R34, a resistor R35, a resistor R36, a capacitor C31, a capacitor C9, a resistor R32, a resistor R37, a switch element Q30, a resistor R24, and a resistor R26. Specifically, the resistor R32 is an NTC thermistor. The output terminal of the comparator U33 is electrically connected to one end of the resistor R24 and the fault signal terminal TMH_ERR. The non-inverting input terminal of the comparator U33 is electrically connected to one end of the resistor R36. The inverting input terminal of the comparator U33 is electrically connected to one end of the resistor R35. One end of the resistor R34 is electrically connected to the reference voltage point VREF2. The other end of the resistor R35 is electrically connected to the other end of the resistor R34, one end of the capacitor C9, one end of the resistor R32, and one end of the resistor R37. The other end of the resistor R36 is electrically connected to one end of the capacitor C31 and the reference voltage point VREF1. The other end of the resistor R37 is electrically connected to a current-passing end of the switch element Q30. The other end of the resistor R24 is electrically connected to one end of the resistor R26 and the control end of the switch element Q30. The other end of the resistor R26 is electrically connected to the other current-passing end of the switch element Q30, the other end of the resistor R32, the other end of the capacitor C9, the other end of the capacitor C31 and the power supply docking terminal B−.

Optionally, the comparator U33 is powered by the power supply device 400. The capacitor C9 or the capacitor C31 is a filter capacitor.

Specifically, the resistance of the NTC thermistor R32 is affected by the ambient temperature, and the higher the temperature, the smaller the resistance, and vice versa. A voltage is introduced from the reference voltage point VREF2 through a resistor R34, and the change in the resistance of the resistor R32 along the temperature is converted into a voltage signal that changes synchronously with the temperature, and the voltage signal is input to the inverting input terminal of the comparator U33 by the resistor R35. The resistor R36 inputs a reference voltage signal from the reference voltage point VREF1 to the non-inverting input terminal of the comparator U33. In a case where the current temperature is higher than the set value, when the voltage at the inverting input terminal of the comparator U33 is lower than the voltage at the non-inverting input terminal of the comparator U33, the output terminal of the comparator U33 outputs a fault signal to the fault signal terminal TMH_ERR, thereby triggering the alarm state of the fault processing module 24.

When the output terminal of the comparator U33 outputs a high-level signal, the resistor R24 and the resistor R26 form a voltage divider circuit which triggers the switch element Q30 to connect the path between the two current-passing ends, so the resistor R37 is connected in parallel with the resistor R32, thereby reducing the voltage at the inverting input terminal of the comparator U33. Therefore, the resistance value of the resistor R32 needs to rise to a value higher than the resistance value when the output terminal of the comparator U33 outputs a high-level signal, so that the output terminal of the comparator U33 can output a low-level fault release signal and release the alarm state of abnormal temperature, which is equivalent to the alarm being released only when the temperature after the alarm drops below the set value.

Optionally, the triggering temperature of the high temperature alarm is 100° C., and the release temperature is 80° C. It is understandable that the two temperatures can be set by adjusting the resistance values of the resistors R34 and R37 as needed.

Figure 8B:
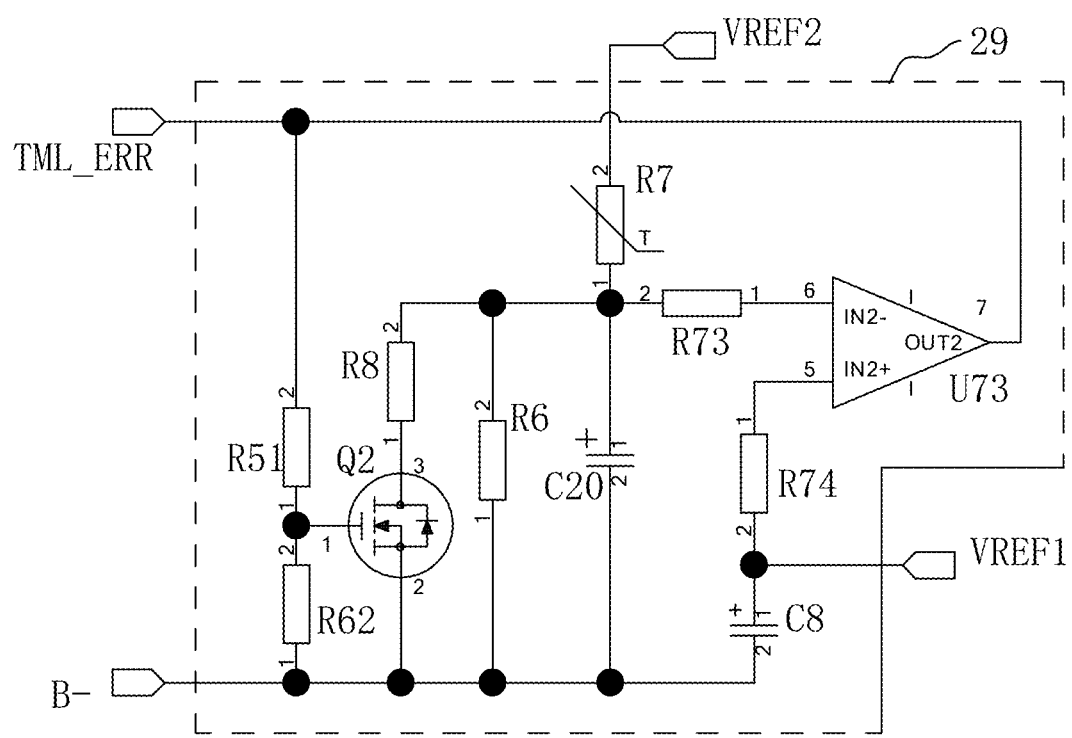
FIG. 8b is a schematic diagram of the structure of a low temperature detection module in a jumper control circuit according to an embodiment of the present application.

Specifically, as shown in FIG. 8b, the low temperature detection module 29 comprises a comparator U73, a resistor R7, a resistor R73, a resistor R74, a capacitor C8, a capacitor C20, a resistor R6, a resistor R8, a switch element Q2, a resistor R51 and a resistor R62. Specifically, the resistor R7 is an NTC thermistor. The comparator U73 is directly powered by the power supply device 400. The output terminal pin of the comparator U73 is electrically connected to one end of the resistor R51 and the fault signal terminal TML_ERR. The non-inverting input terminal of the comparator U73 is electrically connected to one end of the resistor R74. The inverting input terminal of the comparator U73 is electrically connected to one end of the resistor R73. One end of the resistor R7 is electrically connected to the reference voltage point VREF2. The other end of the resistor R73 is electrically connected to the other end of the resistor R7, one end of the capacitor C20, one end of the resistor R6 and one end of the resistor R8. The other end of the resistor R74 is electrically connected to one end of the capacitor C8 and the reference voltage point VREF1. The other end of the resistor R8 is electrically connected to a current-passing end of the switch element Q2. The other end of the resistor R51 is electrically connected to one end of the resistor R62 and the control end of the switch element Q2. The other end of the resistor R62 is electrically connected to the other current-passing end of the switch element Q2, the other end of the resistor R6, the other end of the capacitor C20, the other end of the capacitor C8 and the power supply docking terminal B−.

Specifically, the comparator U73 is powered by the power supply device 400. Capacitor C8 and capacitor C20 are filter capacitors. The resistance of the NTC thermistor R7 is affected by the ambient temperature. The lower the temperature, the greater the resistance, and vice versa. The resistor R7 introduces a voltage from the reference voltage point VREF2, and converts its own resistance value with the change of temperature, in conjunction with the resistor R6, into a voltage signal that changes synchronously with the temperature, and the voltage signal is input to the inverting input terminal of the comparator U73 by the resistor R73. The greater the resistance of the resistor R7, the lower the voltage at the inverting input terminal of the comparator U73. Equivalently, the lower the temperature, the lower the voltage at the inverting input terminal of the comparator U73, and vice versa.

Specifically, the resistor R74 inputs a reference voltage signal from the reference voltage point VREF1 to the non-inverting input terminal of the comparator U73. When the voltage at the inverting input terminal of the comparator U73 is lower than the voltage at its non-inverting input terminal, the output terminal of the comparator U73 outputs a high-level signal to the fault signal terminal TML_ERR, thereby triggering the alarm state of the fault processing module 24. It can be understood that the alarm is triggered after the current temperature is lower than the set value.

When the output terminal of the comparator U73 outputs a high-level signal, the resistor R51 and the resistor R62 form the voltage divider circuit which triggers the switch element Q2 to connect the path between the two current-passing ends, so the resistor R8 is connected in parallel with the resistor R6, thereby reducing the voltage at the inverting input terminal of the comparator U73. The resistance value of the resistor R7 needs to be reduced to make the voltage at the inverting input terminal higher than the voltage at the non-inverting input terminal, so that the output terminal of the comparator U73 can output a low-level fault release signal, thereby releasing the alarm state of abnormal temperature. It can be understood that the alarm can only be released when the temperature after the alarm rises to a value higher than the set value.

It is understandable that the temperature of the low temperature alarm is set to −30° C., and the release temperature is set to 25° C. It is understandable that the two temperatures can also be set by adjusting the resistance values of the resistors R6 and R8 as needed.

The above implementation embodiments are merely descriptions of the preferred embodiments of the present application, and are not intended to limit the scope of the present application. Without departing from the spirit of the present application, various modifications and improvements made to the technical solutions of the present application by a person skilled in the art shall fall within the protection scope determined by the claims of the present application.

The invention claimed is:

1. A jumper control circuit, comprising:
 a switch module used to electrically connect to a circuit loop where a power supply device and a power consumption device are located; the switch module has an ON state and an OFF state;
 a power supply detection module used to be electrically connected between a positive electrode and a negative electrode of the power supply device, and to generate a fault signal when an output voltage of the power supply device exceeds a predetermined voltage range;
 an impedance detection module electrically connected to the switch module; when a impedance of the power consumption device in the circuit loop is within a predetermined impedance range, the impedance detection module triggers the switch module to switch to the ON state; and
 a fault processing module electrically connected to the switch module; when receiving the fault signal, the fault processing module triggers the switch module to switch to the OFF state.

2. The jumper control circuit according to claim 1, wherein the impedance detection module comprises a first resistor branch, a comparator U41 and a comparator U42;
 the first resistor branch is used to be electrically connected between the negative electrode of the power supply device and a negative electrode of the power consumption device; a middle node of the first resistor branch outputs a first feedback voltage to an inverting input terminal of the comparator U41; when the first feedback voltage is less than a first predetermined voltage value, an output terminal of the comparator U41 outputs the fault signal; one end of the first resistor branch outputs a second feedback voltage to a non-inverting input terminal of the comparator U42; when the second feedback voltage is greater than a second predetermined voltage value, an output terminal of the comparator U42 triggers the switch module to switch to the ON state.

3. The jumper control circuit according to claim 1, wherein the fault processing module comprises a resistor R85, a resistor R84, a resistor R50, a resistor R46, a resistor R99, a resistor R41, a resistor R29, a resistor R53 and a switch element Q3; each of the resistors R85, R84, R50, R46, R99, R41 and R29 is used to receive the fault signal at one end and be electrically connected to a control end of the switch element Q3 at an other end; the resistor R53 is electrically connected between a power supply docking terminal and a current-passing end of the switch element Q3, and an other current-passing end of the switch element Q3 is electrically connected to an other power supply docking terminal; and the current-passing end of the switch element Q3 is further electrically connected to the switch module.

4. The jumper control circuit according to claim 1, wherein the switch module comprises a relay RLY, a switch element Q1 and a second resistor branch; the relay RLY comprises a coil and a pair of normally open contacts; the switch element Q1 comprises a control end and two current-passing ends; one end of the coil is electrically connected to a current-passing end of the switch element Q1, an other end of the coil is used to electrically connect to the positive electrode of the power supply device, and an other current-passing end of the switch element Q1 is used to electrically connect to the negative electrode of the power supply device; one end of the second resistor branch is electrically connected to a current-passing end of the switch element Q1, and an other end of the second resistor branch is used to electrically connect to the positive electrode of the power supply device; when the impedance of the power consumption device in the circuit loop is within the predetermined impedance range, the impedance detection module triggers the switch element Q1 to be ON; one contact of the pair of normally open contacts is used to electrically connect to the negative electrode of the power supply device, and an other contact is used to electrically connect to the negative electrode of the power consumption device.

5. The jumper control circuit according to claim 4, wherein further comprises a disconnection fault detection module electrically connected to the fault processing module and a load docking terminal; the disconnection fault detection module is also electrically connected to the current-passing end of the switch element Q1; when the switch element Q1 is OFF and a potential of the load docking terminal relative to the negative electrode of the power supply device is less than a third predetermined voltage value, the disconnection fault detection module outputs the fault signal.

6. The jumper control circuit according to claim 5, wherein the disconnection fault detection module comprises a comparator U22, a resistor R52, a resistor R57, a resistor R58, a resistor R39, a diode D4, and a capacitor C5; one end of the resistor R52 is electrically connected to the load docking terminal; an other end of the resistor R52 is electrically connected to an inverting input terminal of the comparator U22; one end of the resistor R57 is used to be electrically connected to a reference voltage point, and an other end of the resistor R57 is electrically connected to a non-inverting input terminal of the comparator U22 and one end of the resistor R58; one end of the resistor R39 is electrically connected to an output terminal of the comparator U22, and an other end of the resistor R39 is electrically connected to the fault processing module; an other end of the resistor R39 is also electrically connected to an anode of the diode D4 and one end of the capacitor C5; a cathode of the diode D4 is electrically connected to the switch module; an other end of the resistor R58 and an other end of the capacitor C5 are respectively electrically connected to a power supply docking terminal.

7. The jumper control circuit according to claim 1, further comprises a light indication module and a sound warning module respectively electrically connected to the fault processing module; when receiving the fault signal, the fault processing module further triggers the light indication module to generate an alarm light and triggers the sound warning module to generate an alarm sound.

8. The jumper control circuit according to claim 7, wherein the light indication module comprises an indicator light LED2 and an indicator light LED1; after receiving the fault signal, the fault processing module triggers the light indication module to turn off the indicator light LED2 and turn on the indicator light LED1.

9. The jumper control circuit according to claim 7, wherein the sound warning module comprises a buzzer BEE1; after receiving the fault signal, the fault processing module triggers the sound warning module to make the buzzer BEE1 emit a sound.

10. The jumper control circuit according to claim 1, further comprises a reverse current detection module; the reverse current detection module is used to be electrically connected between the negative electrode of the power supply device and a load docking terminal; when a potential of the load docking terminal is greater than a potential of the negative electrode of the power supply device, the reverse current detection module generates the fault signal.

11. The jumper control circuit according to claim 10, wherein the reverse current detection module comprises a resistor R30, a resistor R33, a resistor R31 and a comparator U32; one end of the resistor R30 is electrically connected to a reference voltage point, and an other end of the resistor R30 is electrically connected to one end of the resistor R33 and an inverting input terminal of the comparator U32; an other end of the resistor R33 is electrically connected to the load docking terminal; one end of the resistor R31 is electrically connected to a power supply docking terminal, and an other end of the resistor R31 is electrically connected to a non-inverting input terminal of the comparator U32; an output terminal of U32 is electrically connected to the fault processing module 24.

12. The jumper control circuit according to claim 1, further comprises a delay module electrically connected to the switch module; the delay module periodically interrupts control of the impedance detection module to the switch module and triggers the switch module to switch to the OFF state.

13. The jumper control circuit according to claim 12, wherein the delay module comprises a resistor R63, a resistor R27, a chip U5 and a switch element Q6; the chip U5 is provided with a plurality of pins; the chip U5 is integrated with a second timer; a fourth pin of the chip U5 is electrically connected to one end of the resistor R27; an other end of the resistor R27 is electrically connected to one end of the resistor R63 and a control end of the switch element Q6; one current-passing end of the switch element Q6 is electrically connected to a turn-on signal terminal of the switch module, and an other current-passing end of the switch element Q6 is electrically connected to a power supply docking terminal and an other end of the resistor R63.

14. The jumper control circuit according to claim 13, wherein the switch module is provided with the turn-on signal terminal electrically connected to the delay module; the delay module further comprises a resistor R68 and a diode D3; a third pin of the chip U5 is connected to one end of the resistor R68, and an other end of the resistor R68 is electrically connected to an anode of the diode D3; a cathode of the diode D3 is electrically connected to the turn-on signal terminal.

15. The jumper control circuit according to claim 13, wherein the delay module further comprises a resistor R16, a resistor R20, a capacitor C19 and a diode D5; one end of the capacitor C19 is electrically connected to a first pin of the chip U5 and a reference voltage point; an other end of the capacitor C19 is electrically connected to the power supply docking terminal.

16. The jumper control circuit according to claim 12, wherein the delay module comprises a button K1; when the button K1 is triggered, the delay module triggers the switch module to switch to the ON state.

17. The jumper control circuit according to claim 12, further comprises a forward current detection module; the forward current detection module is used to be electrically connected between the negative electrode of the power supply device and the negative electrode of the power consumption device; when the potential of the negative electrode of the power consumption device relative to the negative electrode of the power supply device is greater than a fourth predetermined voltage value, the forward current detection module outputs a power-on signal; when receiving the power-on signal, the delay module stops interrupting the impedance detection module and stops triggering the switch module.

18. The jumper control circuit according to claim 17, wherein the forward current detection module comprises a resistor R55, a capacitor C3, a resistor R56, a capacitor C53, a resistor R21, a resistor R22, a comparator U23, a resistor R38, a resistor RB1, a capacitor C7, a switch element Q5, a resistor R15, a resistor R23 and a switch element Q20; one end of the resistor R55 is electrically connected to one end of the capacitor C3 and a load docking terminal; an other end of the capacitor C3 is electrically connected to a power supply docking terminal; an other end of the resistor R55 is electrically connected to a non-inverting input terminal of the comparator U23; one end of the resistor R56 is electrically connected to one end of the capacitor C53, one end of the resistor R21, and one end of the resistor R22 respectively; an other end of the resistor R21 is electrically connected to the reference voltage point; an other end of the resistor R56 is electrically connected to an inverting input terminal of the comparator U23; an other end of the capacitor C53 and an other end of the resistor R22 are electrically connected to the power supply docking terminal respectively; an output terminal of the comparator U23 is electrically connected to one end of the resistor R38; an other end of the resistor R38 is electrically connected to one end of the resistor R15 and a current-passing end of the switch element Q5; an other end of the resistor R15 is electrically connected to one end of the resistor R23 and a control end of the switch element Q20; an other end of the resistor R23 is electrically connected to a current-passing end of the switch element Q20; an other current-passing end of the switch element Q20 is electrically connected to the delay module; one end of the resistor RB1 is electrically connected to the switch module; an other end of the resistor RB1 is electrically connected to one end of the capacitor C7 and a control end of the switch element Q5; an other end of the capacitor C7 is electrically connected to an other current-passing end of the switch element Q5 and the power supply docking terminal.

19. A jumper device, comprising the jumper control circuit as claimed in claim 1.

* * * * *